(12) United States Patent
Chao et al.

(10) Patent No.: US 7,606,119 B2
(45) Date of Patent: Oct. 20, 2009

(54) OBJECTIVE LENS ACTUATOR

(75) Inventors: Chih-Hang Chao, Tu-Cheng (TW);
Yu-Hsu Lin, San Jose, CA (US);
Jeng-Da Wu, Tu-Cheng (TW);
Chun-Ming Chen, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 449 days.

(21) Appl. No.: 11/309,126

(22) Filed: Jun. 24, 2006

(65) Prior Publication Data

US 2007/0076540 A1 Apr. 5, 2007

(51) Int. Cl.
*G11B 7/00* (2006.01)

(52) U.S. Cl. .................................. 369/44.15; 369/44.14
(58) Field of Classification Search ........................ None
See application file for complete search history.

(56) References Cited

U.S. PATENT DOCUMENTS 4,568,142 A    2/1986  Iguma
7,408,848 B2 *  8/2008  Ke et al. .................. 369/44.14

\* cited by examiner

*Primary Examiner*—Muhammad N. Edun
(74) *Attorney, Agent, or Firm*—Wei Te Chung

(57) ABSTRACT

In one preferred embodiment, an objective lens actuator includes a base, a suspension apparatus mounted on the base, a holder suspended by the suspension apparatus for holding an objective lens, a voice coil motor (VCM) for driving the holder to vibrate, and a cover. The VCM includes a first yoke, a second yoke and a pair of magnets fixed on the first yoke and the second yoke respectively. The first yoke and the second yoke respectively include a first part and a second part. The cover is made of a material having a magnetic conductivity. The cover connects the first part and the second part of each of the first yoke and the second yoke.

16 Claims, 3 Drawing Sheets

OBJECTIVE LENS ACTUATOR

FIELD OF THE INVENTION

The present invention relates to optical pickup apparatuses, and particularly to an objective lens actuator.

DESCRIPTION OF RELATED ART

Generally, an objective lens actuator of an optical pickup apparatus includes a base, a suspension mounted on the base, a lens holder for holding an objective lens, a voice coil motor (VCM) driving the lens holder, and a cover on the base. A VCM includes a pair of U-shaped yokes mounted on the base, a pair of permanent magnets respectively mounted in the pair of yokes, a focusing coil and four tracking coils. The cover is generally made of a plastic material. When a current flows through the focusing coil of the VCM, the VCM vibrates in the magnetic field formed by the pair of permanent magnets. The lens holder driven by the VCM also vibrates to precisely focus a laser light through the objective lens on a correct track so that data may be accurately read from or written to a data storage medium. Thus, preserving capability of precisely focusing on the correct track is a key point in the design of an objective actuator. Equilibrium of the magnetic field is an important issue for maintaining the capability of precisely focusing on the correct track. However, each of the yokes is U-shaped and has an opening in a top thereof, and the cover has no magnetic conductivity, so the magnetic conductivity of a top of each of the yokes is low. Therefore, a magnetic flux density of bottom areas within the yokes is greater than that of top areas within the yokes. Thus, the magnetic field within the yokes is not uniform, resulting in less than an optimum result when attempting to focus the lens.

What is needed is to provide an objective lens actuator in which the magnet can form a uniform magnetic field.

SUMMARY OF THE INVENTION

In one preferred embodiment, an objective lens actuator includes a base, a suspension apparatus mounted on the base, a holder suspended by the suspension apparatus for holding an objective lens, a voice coil motor (VCM) for driving the holder to vibrate, and a cover. The VCM includes a first yoke, a second yoke, and a pair of magnets fixed on the first yoke and the second yoke respectively. The first yoke and the second yoke respectively include a first part and a second part. The cover is made of a material having a magnetic conductivity. The cover connects the first part and the second part of each of the first yoke and the second yoke.

Other advantages and novel features of the invention will become more apparent from the following detailed description when taken in conjunction with the accompanying drawings, in which:

DETAILED DESCRIPTION OF THE INVENTION

Figure 1:
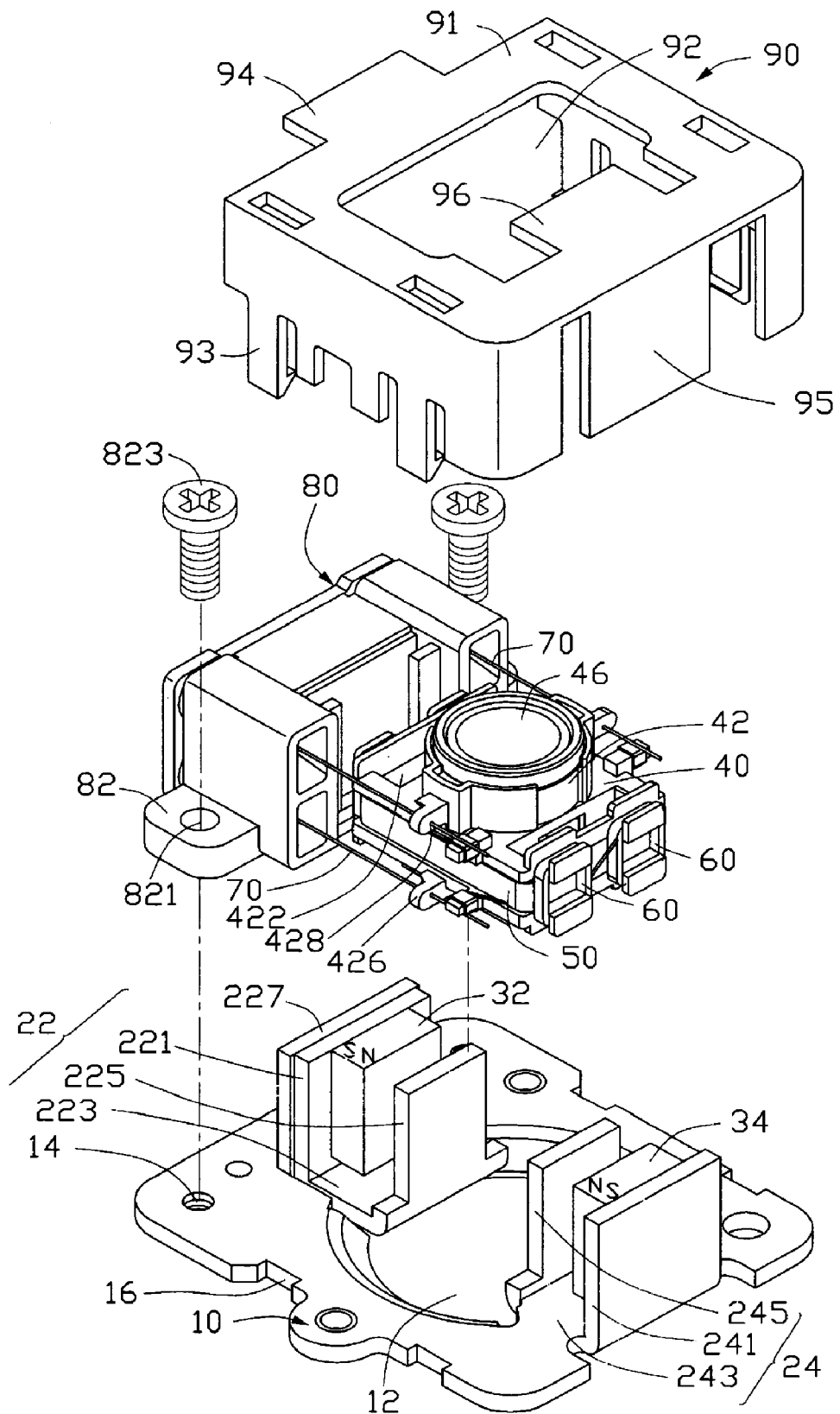
FIG. 1 is an exploded, isometric view of an objective lens actuator in accordance with a preferred embodiment of the present invention, the objective lens actuator includes a base, magnets, yokes, an objective lens, a lens holder, and a cover.

Referring to FIG. 1, an objective lens actuator in accordance with a preferred embodiment of the present invention includes a base 10, a pair of U-shaped yokes 22 and 24, a pair of magnets 32 and 34, an objective lens 46, a lens holder 40 for holding the objective lens 46, a focusing coil 50, four tracking coils 60, four wires 70, a fixture 80, and a cover 90.

The base 10 defines a loophole 12 in a center thereof, and two threaded holes 14 are defined in opposite corners of a left side. Two pairs of cutouts 16 are defined in a front side and a back side of the base 10 respectively. The yokes 22 and 24 are mounted on and protrude up from the base 10 at two opposite sides of the loophole 12 respectively. The yoke 22 includes a first part 221 located away from the loophole 12, a second part 225 located near the loophole 12, a bottom part 223 connecting the first part 221 and the second part 225, and a void part extending along the top side of the yoke 22. A magnetic portion 227 is located at an outside of the first part 221. The yoke 24 includes a first part 241 away from the loophole 12, a second part 245 near the loophole 12, a bottom part 243 connecting the first part 221 and the second part 225, and a void part extending along the top side of the yoke 24. The magnets 32 and 34 are respectively received in the yokes 22 and 24, and mounted on inner sidewalls of the first parts 211 and 241. North poles of the magnets 32 and 34 face each other. The second parts 225 and 245 are made of materials having magnetic permeability.

The lens holder 40 defines a circular through hole (not shown in the FIG.) thereof, corresponding to the loophole 12 of the base 10. A receiving portion 42 is fixed on the lens holder 40 and the objective lens 46 is received in the receiving portion 42. A pair of slots 422 is defined in the lens holder 40 for the second part 225 of the yoke 22 and the second part 245 of the yoke 24 passing therethrough. Two pairs of latching portions 426 are respectively attached on two sides of the lens holder 40. Each latching portion 426 has a through hole 428. Each wire 70 runs through a corresponding through hole 428 and one end of each wire 70 is fixed in one end of the fixture 80. The focusing coil 50 encircles an end of the lens holder 40, and is electrically connected to the wires 70. Two of the tracking coils 60 are mounted to one side of the lens holder 40, and the other two of the tracking coils 60 are mounted to the opposite side of the lens holder 40. The tracking coils 60 are also electrically connected to the wires 70. A top surface of the focusing coil 50 is perpendicular to an optical axis of the objective lens 46. The tracking coils 60 are mounted on a same plane parallel to the optical axis of the objective lens 46.

The fixture 80 includes a pair of fixing portions 82 extending from opposite sides thereof. Each fixing portion 82 defines a through hole 821, corresponding to each threaded hole 14 of the base 10.

The cover 90 includes a top plate 91. An opening 92 is defined in a middle of the top plate 91, corresponding to the objective lens 46. Two pairs of latches 93 respectively extend down from a front side and a back side of the top plate 91, corresponding to the cutouts 16 of the base 10. A side plate 95 extends down from a right side of the top plate 91, which can cover an outside of the first part 241 of the yoke 24. A first block 94 extends horizontally from a left side of the top plate 91. A second block 96 extends horizontally from a right side of the opening 92. The cover 90 is made of a material having a magnetic conductivity. The first part 221 magnetically connects to the second part 225 of the yoke 22 through the first block 94 and the top plate 91. The first part 241 magnetically connects to the second part 245 of the yoke 24 through the second block 96 and the top plate 91.

Figure 2:
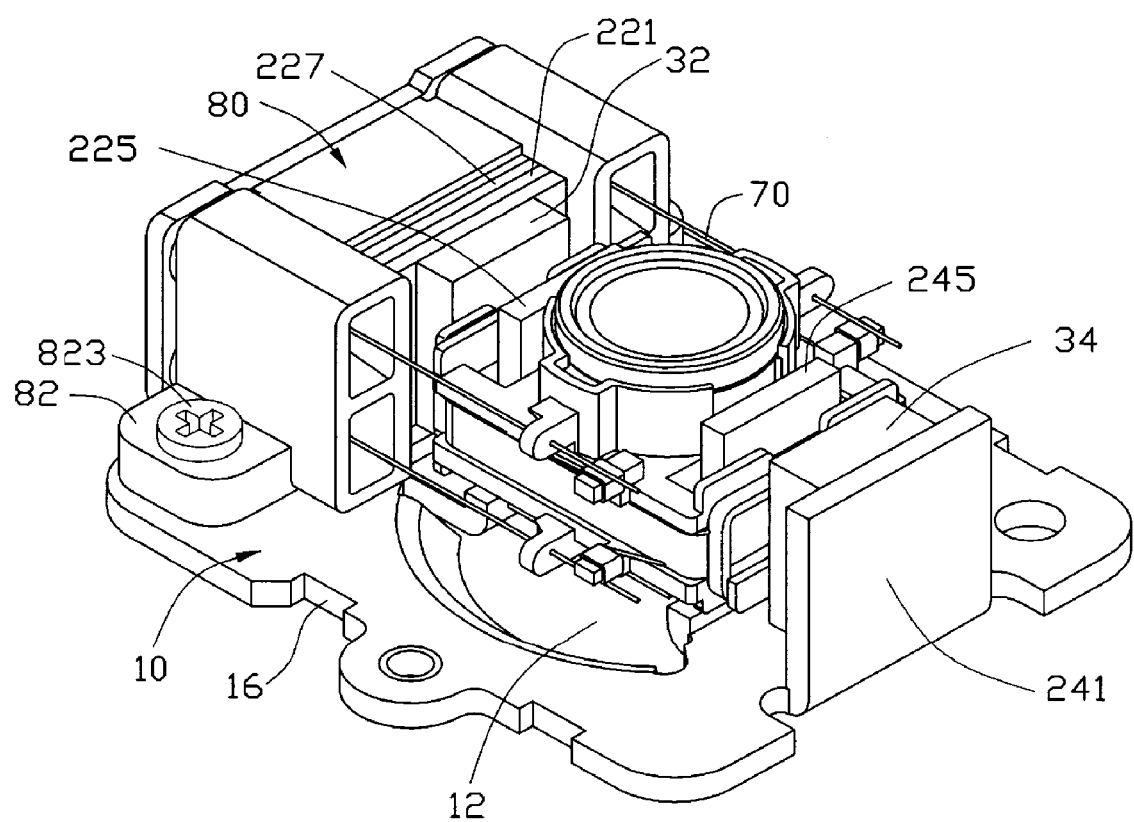
FIG. 2 is an assembled view of the base, the yokes, the magnets, the objective lens, and the lens holder of FIG. 1.

Referring to the FIG. 2, in assembly, the fixture 80 is installed on the base 10, by two screws 823 being inserted through the through holes 821 and locked into the threaded holes 14 of the base 10. The second part 225 of the yoke 22 and the second part 245 of the yoke 24 are respectively received into the slots 422 of the lens holder 40. The objective lens 46 is suspended above the loophole 11 of the base 10. Light passes through the loophole 11 and irradiates on the objective lens 46. Thus, the fixture 80, the wires 70, the lens holder 40, the objective lens 46, the focusing coil 50, and the tracking coils 60 are mounted on the base 10. The yokes 22 and 24, the magnets 32 and 34, the focusing coil 50, and the tracking coils 60 cooperatively form a voice coil motor (VCM). The fixture 80 and the wires 70 cooperatively form a suspension apparatus.

Figure 3:
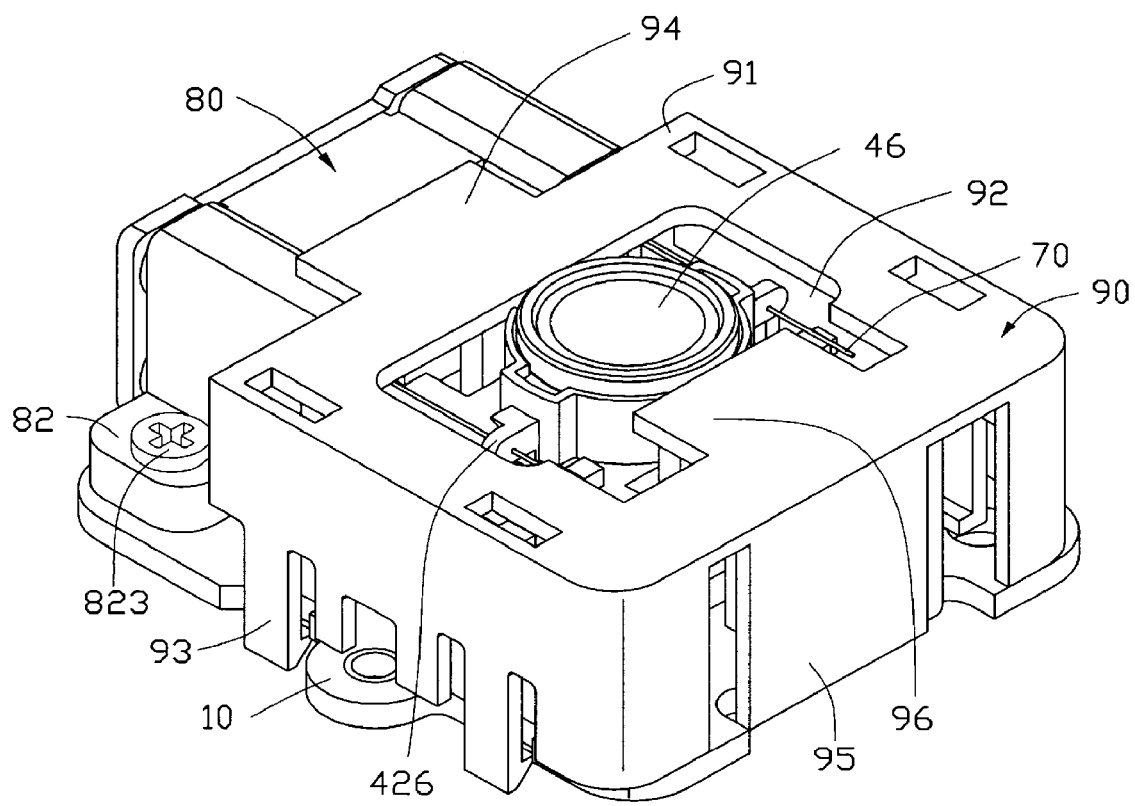
FIG. 3 is an assembled view of FIG. 1.

Referring to the FIG. 3, the cover 90 covers the base 10. The latches 93 are engaged with the cutouts 16 of the base 10. The first block 94 magnetically connects the tops of the first part 221 and the second part 225 of the yoke 22, and the second block 96 magnetically connects the tops of the first part 241 and the second part 245 of the yoke 24.

When the objective lens actuator of the this invention is at work, a current flows through the focusing coil 50, a Lorentz force acts on the focusing coil 50 parallel to the optical axis of the objective lens 46. Thus, the focusing coil 8 drives the lens holder 40 to move along the optical axis of the objective lens 46. When a current flows through the tracking coils 60, a Lorentz force acts on the tracking coils 60 perpendicular to the optical axis of the objective lens 46. Thus, the tracking coils 60 drive the objective lens holder 40 to move in a plane perpendicular to the optical axis of the objective lens 46. Thus, the objective lens 46 is on a correct track and data can be accurately read from or written to a data storage medium.

In the illustrated embodiment, the first part 221 and the second part 225 of the yoke 22 are magnetically connected together, and the first part 241 and the second part 245 of the yoke 24 are magnetically connected together. Therefore, the magnetic conductivity of the tops of the first yoke and the second yoke is increased, and the magnetic flux density of the overall magnetic field of the yokes 21 and 22 is uniform. Additionally, magnetic flux densities of the yokes 22 and 24 are increased and the current flowing through the focusing coils 50 and the tracking coils 60 can be decreased. Thus, heat generated by the objective lens actuator will be decreased and operational life of the objective lens actuator will be prolonged.

It is believed that the present embodiments and its advantages will be understood from the foregoing description, and it will be apparent that various changes may be made thereto without departing from the spirit and scope of the invention or sacrificing all of their material advantages, the examples hereinbefore described merely being preferred or exemplary embodiments of the invention.

What is claimed is:

1. An objective lens actuator comprising:
   a base;
   a suspension apparatus mounted on the base;
   a holder for holding an objective lens, the holder suspended by the suspension apparatus;
   a voice coil motor (VCM) driving the holder to vibrate, the VCM comprising a first yoke, a second yoke, and a pair of magnets fixed on the first yoke and the second yoke respectively, the first yoke and the second yoke respectively comprising a first part and a second part; and
   a cover made of a material having a magnetic conductivity, the cover comprising a top plate defining a through hole corresponding to the objective lens, a first block for connecting tops of the first part and the second part of the first yoke, and a second block for connecting tops of the first part and the second part of the second yoke.

2. The objective lens actuator as claimed in claim 1, wherein the base comprises a loophole in a middle thereof, a cutout in one side thereof, and a threaded hole in a corner thereof.

3. The objective lens actuator as claimed in claim 2, wherein the suspension apparatus comprises a fixture and a plurality of wires, and the fixture comprises a through hole corresponding to the threaded hole of the base, and one end of each of the wires is fixed on the fixture and another end of each of the wires is connected to the lens holder.

4. The objective lens actuator as claimed in claim 2, wherein the cover further comprises a side plate extending down from one side of the top plate, and a latch extending from another side of the top plate corresponding to the cutout of the base.

5. The objective lens actuator as claimed in claim 2, wherein the first yoke and the second yoke are U-shaped, and the second part of the first yoke and the second part of the second yoke are located near the loophole, and the first part of the first yoke and the first part of the second yoke are located away from the loophole, and the first part and the second part of each of the first yoke and the second yoke each receive a magnet therebetween.

6. The objective lens actuator as claimed in claim 5, wherein the second part of each of the first yoke and the second yoke is made of a material having magnetic permeability.

7. The objective lens actuator as claimed in claim 1, wherein the VCM further comprises a focusing coil encircling the lens holder, and a plurality of tracking coils mounted on two opposite sides of the holder.

8. The objective lens actuator as claimed in claim 1, wherein a magnetic portion is attached to an outside of the first part of the first yoke.

9. An objective lens actuator comprising:
   a base;
   a suspension apparatus mounted on the base;
   a holder for holding an objective lens, the holder suspended by the suspension apparatus;
   a voice coil motor (VCM) driving the holder to vibrate, the VCM comprising a first U-shaped yoke, a second U-shaped yoke facing the first U-shaped yoke, and a pair of magnets fixed on the first yoke and the second yoke respectively, each of the first and second U-shaped yokes comprising a first part and a second part, a distance between the first parts of the first and second U-shaped yokes being shorter than a distance between the second parts of the first and second U-shaped yokes; and
   a cover made of a material having magnetic conductivity, the cover covering tops of the first and second parts of each of the first yoke and the second yoke respectively to increase the magnetic conductivity of the tops of the first yoke and the second yoke.

10. The objective lens actuator as claimed in claim 9, wherein the base comprises a loophole in a middle thereof, a cutout in one side thereof, and a threaded hole in a corner thereof.

11. The objective lens actuator as claimed in claim 10, wherein the suspension apparatus comprises a fixture and a plurality of wires, and the fixture comprises a through hole corresponding to the threaded hole of the base, and one end of each of the wires is fixed on the fixture and another end of each of the wires is connected to the lens holder.

12. The objective lens actuator as claimed in claim 10, wherein the cover comprises a top plate defining a through hole corresponding to the objective lens, a side plate extending down from one side of the top plate, a latch extending from another side of the top plate corresponding to the cutout of the base, a first block and a second block for covering tops of the first yoke and the second yoke respectively.

13. The objective lens actuator as claimed in claim 10, wherein the first yoke and the second yoke are made of materials having magnetic permeability.

14. The objective lens actuator as claimed in claim 10, wherein the VCM further comprises a focusing coil encircling the lens holder, a plurality of tracking coils mounted on two opposite sides of the holder.

15. The objective lens actuator as claimed in claim 10, wherein a magnetic portion is attached at an outside of the first yoke.

16. An optical apparatus comprising:
    means for performing image-pickup function of said optical apparatus installable in said optical apparatus;
    an objective lens installable in said optical apparatus next to said means, said objective lens transmitting light therethrough between said means and a target of said optical apparatus; and
    an actuator installable beside said objective lens to adjustably control a relative location of said objective lens in said optical apparatus, said actuator comprising a holder to hold said objective lens, and a voice coil motor (VCM) to drive said holder for controlling of said relative location of said objective lens, said VCM comprising at least one U-shaped yoke which contributes to generation of a magnetic field in said VCM and defines a void part at a side thereof, a cover of said actuator covering said objective lens and said VCM jointly to form said actuator, and spanning across said void part of said at least one U-shaped yoke to substantially connect two separate parts of said at least one U-shaped yoke located oppositely beside said void part together when said cover is placed on said at least one U-shaped yoke in order to contribute to adjusting magnetic flux of said magnetic field in said VCM along said side of said at least one U-shaped yoke.

\* \* \* \* \*

UNITED STATES PATENT AND TRADEMARK OFFICE
CERTIFICATE OF CORRECTION

PATENT NO.        : 7,606,119 B2                                      Page 1 of 1
APPLICATION NO. : 11/309126
DATED             : October 20, 2009
INVENTOR(S)       : Chao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Fifth Day of October, 2010

David J. Kappos
*Director of the United States Patent and Trademark Office*